UNITED STATES PATENT OFFICE.

JOHN B. HOAG, OF JUDSONIA, ARKANSAS.

INSECTICIDE.

SPECIFICATION forming part of Letters Patent No. 312,270, dated February 17, 1885.

Application filed September 29, 1884. (No specimens.)

*To all whom it may concern:*

Be it known that I, JOHN B. HOAG, a citizen of the United States, residing at Judsonia, in the county of White and State of Arkansas, have invented a new and useful composition of matter to be used as an insecticide in preventing and destroying insects and their larvæ from destroying fruit-trees and fruits, of which the following is a specification.

My composition consists of the following ingredients, combined in the proportions stated, viz: water, forty gallons; pulverized American hellebore-root, (*Veratrum viride,*) one pound; pulverized capsicum, (African,) one pound; paris-green, one-fourth pound; sugar, one-fourth pound; carbolic acid, one dram, prepared as follows: Put the hellebore-root, capsicum, paris-green, and sugar in a kettle, add one gallon of water, and boil it ten minutes. Then put it in the forty gallons of water, to which add the carbolic acid. Then stir until it is well incorporated. Use as soon as made. Apply with a spray-pump in dry weather or after a rain. For the codling-moth, as soon as the bloom is fairly shed, and two weeks thereafter. For the plum-curculio, when it gets the size of a large pea, and about two weeks thereafter. For the peach, when it gets about three-quarters of an inch in diameter, and from two to four weeks thereafter through the season, as it may require. For the borers, apply to the bodies of trees when used for the fruits, as about that time the egg is laid on the outside bark.

I am aware that carbolic acid, paris-green, hellebore-root, and capsicum have been used singly for the destruction of insects; but I am not aware that all of the ingredients of my composition in the proportions stated have been used together as an insecticide.

What I claim, and desire to secure by Letters Patent of the United States, is—

The herein-described composition of matter, consisting of capsicum, (African,) (cayenne-pepper,) American hellebore-root, (*Veratrum viride,*) paris-green, sugar, and carbolic acid, to be used as an insecticide, in the proportions specified.

JOHN B. HOAG.

Witnesses:
WM. DEVENY,
L. A. MARTIN.